United States Patent
Zlotnick et al.

(10) Patent No.: US 11,093,333 B1
(45) Date of Patent: Aug. 17, 2021

(54) EFFICIENT RECOVERY OF MULTIPLE VIRTUAL MACHINES

(71) Applicant: EMC IP Holding Company LLC, Hopkinton, MA (US)

(72) Inventors: David Zlotnick, Tel Aviv (IL); Assaf Natanzon, Tel Aviv (IL); Boris Shpilyuck, Ashdod (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 16/376,862

(22) Filed: Apr. 5, 2019

(51) Int. Cl.
*G06F 11/14* (2006.01)
*G06F 9/455* (2018.01)

(52) U.S. Cl.
CPC ...... *G06F 11/1415* (2013.01); *G06F 9/45558* (2013.01); *G06F 2009/45575* (2013.01); *G06F 2201/805* (2013.01)

(58) Field of Classification Search
CPC .............................. G06F 11/14; G06F 11/1415
See application file for complete search history.

(56) References Cited

U.S. PATENT DOCUMENTS

| | | | | |
|---|---|---|---|---|
| 8,849,878 B1* | 9/2014 | Bachu | ................. | H04L 67/1097 707/823 |
| 9,529,617 B2* | 12/2016 | Wang | ................. | G06F 11/1484 |
| 9,575,680 B1* | 2/2017 | Zhang | ................. | G06F 11/1453 |
| 10,284,433 B2* | 5/2019 | Karve | ................. | H04L 67/1097 |
| 10,296,413 B2* | 5/2019 | Marshall | ............. | G06F 11/0709 |
| 2010/0250499 A1* | 9/2010 | McAlister | ........... | G06F 11/1451 707/679 |
| 2011/0225277 A1* | 9/2011 | Freimuth | ............ | G06F 9/45558 709/223 |
| 2013/0085994 A1* | 4/2013 | Michael | ............. | G06F 11/1466 707/639 |
| 2015/0269031 A1* | 9/2015 | Wang | ................. | G06F 9/45558 718/1 |
| 2016/0380840 A1* | 12/2016 | Karve | ..................... | H04L 67/06 709/223 |
| 2019/0250997 A1* | 8/2019 | Karasev | ............. | G06F 9/45558 |
| 2020/0110666 A1* | 4/2020 | Rakesh | ............... | G06F 11/1471 |

* cited by examiner

*Primary Examiner* — Kamini B Patel
(74) *Attorney, Agent, or Firm* — Dergosits & Noah LLP; Todd A. Noah

(57) ABSTRACT

Described is a system that recovers multiple virtual machines (or other computing resource) by leveraging similarities between recovery (or backup) data. The system may identify the recovery data for a particular virtual machine as a primary set of data using specialized calculations and/or heuristics. The system may leverage this primary set of data by replicating a data storage for the remaining number of virtual machines to be recovered. The system may then determine a remaining (or differing) set of data for each of the remaining virtual machines to be recovered. Accordingly, the system may only be required to rehydrate the differing set of data chunks and write those data chunks to the data storage associated with each recovery virtual machine. These recovery virtual machines may then be used to restore corresponding virtual machines within a production environment.

20 Claims, 4 Drawing Sheets ent manner.

EFFICIENT RECOVERY OF MULTIPLE VIRTUAL MACHINES

TECHNICAL FIELD

This disclosure relates to restoring virtual machines, and more particularly, restoring multiple virtual machines in an efficient manner.

BACKGROUND

A data backup and recovery system may provide various tools that are crucial for enterprise level network clients. Clients may rely on such systems to efficiently back up and recover data in the event of user error, data loss, system outages, hardware failure, or other catastrophic events to allow business applications to remain in service or quickly come back up to service after such failure events or outages. It is often the case that the computing resources required to provide such backup and recovery systems are provided within an on-demand (e.g. cloud) services environment. These services may include on-demand recovery infrastructure including resources to recovery virtual machines that are provided within a production environment. For example, when a production virtual machine needs to be recovered or restored, components of a recovery virtual machine may first be created within a secure environment before being deployed to a production environment. For example, multiple instances of a recovery virtual machine may be subject to various tests within the secure environment before being deployed to a production environment. Accordingly, a recovery process may require creating multiple recovery virtual machines at the same time. Thus, there is a need to perform a recovery of multiple virtual machines in an efficient manner to minimize the costs of on-demand computing resources that may be incurred by clients.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
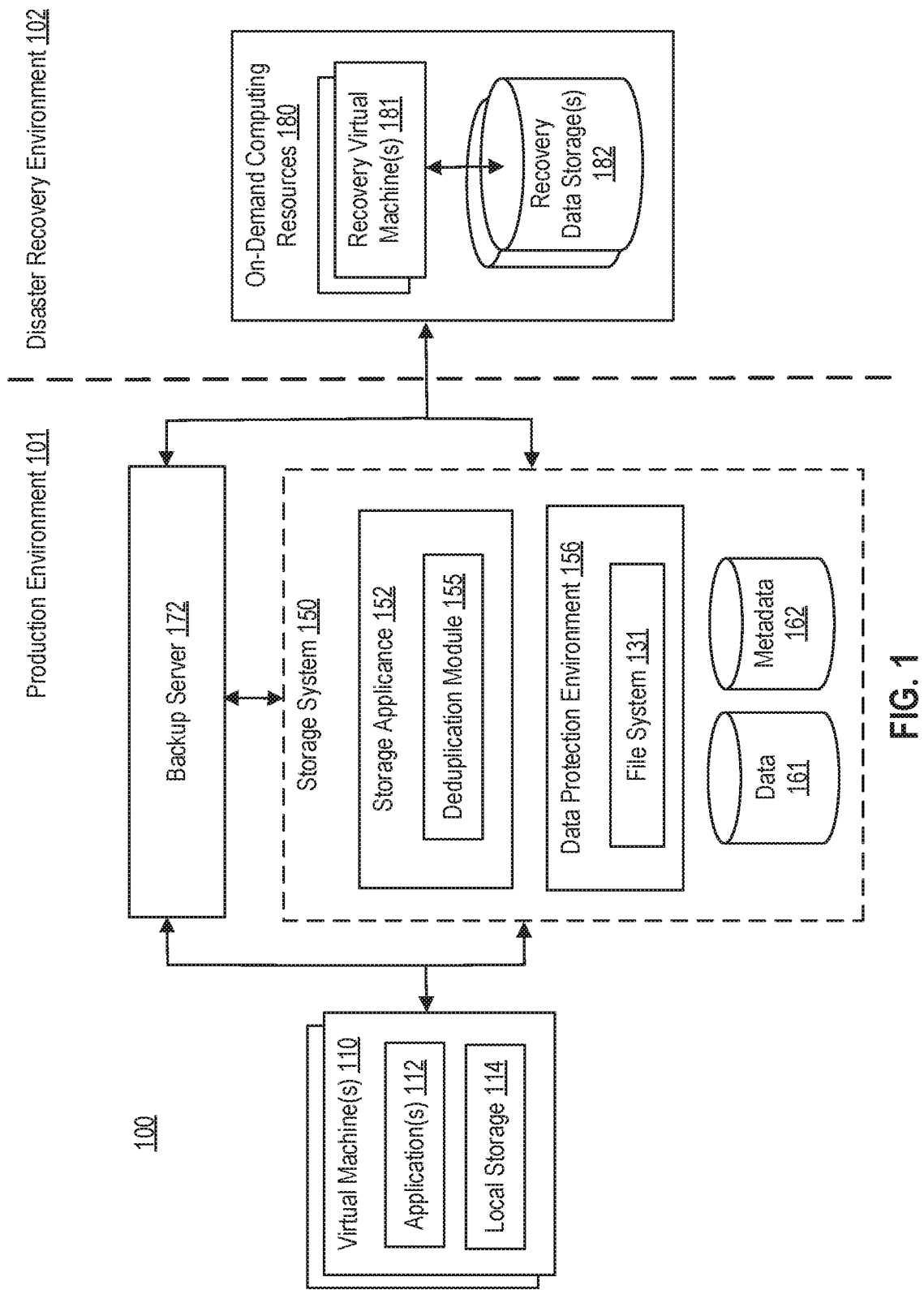
FIG. 1 is a block diagram illustrating an example of an operating environment for recovering multiple virtual machines according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that efficiently recovers multiple virtual machines (or other computing resource) by leveraging similarities between recovery (or backup) data. In some embodiments, the system may recover virtual machines by creating a corresponding recovery virtual machine within a secure environment before being deployed to a production virtual machine. In some embodiments, the system may perform a recovery of multiple virtual machines concurrently (or partially concurrently) as part of the same recovery process. To efficiently restore multiple virtual machines, the system may leverage recovery data chunks that are shared amongst a set of virtual machines. For example, the system may first determine whether the virtual machines to be recovered satisfy a similarity threshold. For instance, the similarity threshold may be based on determining whether a predefined percentage of recovery data chunks are shared between the virtual machines to be recovered. Such a similarity threshold may be user definable or customizable based on a particular recovery application.

Upon determining that at least some of the set of virtual machines to be recovered are sufficiently similar, the system may identify (or classify, assign, label, etc.) the recovery data for a particular virtual machine as a primary set of data. When determining which set of recovery data to identify as the primary data set, the system may perform various specialized calculations and/or heuristics. For example, if the set of virtual machines to be recovered are backup instances of the same virtual machines at different times (e.g. scheduled backup times), the system may select a backup instance that was created at a time in between the other backup instances. Accordingly, such a heuristic may be based on the backup instance created between other backup instances being the most likely to share the most amount of data with the other backup instances. As another example, the system may identify a primary set of recovery data based on virtual machines using various software templates (e.g. operating system template) that would be shared amongst virtual machines. In addition, the system may perform various calculations (e.g. data chunk hash value comparisons) to determine a primary set of data.

As described, the system may create a recovery virtual machine (e.g. within a secure on-demand environment) for each virtual machine to be restored (e.g. each production virtual machine). In addition, each recovery virtual machine may be associated with a data storage (e.g. disk, or virtual disk) that stores the required recovery data (e.g. backup data). Accordingly, once a primary set of recovery data is selected, the system may restore (e.g. rehydrate) the recovery data to a data storage that is associated with a primary recovery virtual machine. The system may then leverage this primary set of data by replicating the data storage for the remaining number of virtual machines. Such a replication process would typically be more efficient than attempting to recover an equal amount of data individually for each virtual machine. The system may then determine a remaining (or differing) set of data between the recovery data of the replicated data storage and the recovery (or specific) data required for each of the remaining virtual machines. The system may then only be required to rehydrate the differing set of data chunks and write those data chunks to the data storage associated with each virtual machine. The system may then associate (e.g. mount) each data storage with an associated recovery virtual machine. These recovery virtual machines may then be used to restore corresponding virtual machines within a production environment. Accordingly, in some embodiments, described is a system that efficiently recovers multiple virtual machines by leveraging shared data chunks.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented in an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as data stores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 for recovering multiple virtual machines according to one or more embodiments of the disclosure. As shown, the operating environment 100 may include a virtual machine(s) 110 that may be associated with a customer of a storage service and a storage system 150 that may be associated with a storage service provider. In addition, the customer may also be associated with a cloud-computing service used for disaster recovery (or other scenario). In some embodiments, the storage service provider and the cloud-computing service used for disaster recovery may be provided by different entities. It should be noted that the components of operating environment 100 may interact via a network, which may be any type of wired or wireless network including a local area network (LAN), a wide area network (WAN), or a direct communication link, or other suitable connection.

As shown, the environment 100 may include a production environment 101 and a disaster recovery environment 102. The production environment 101 may include components that are live and/or used for providing services by the customer of a data storage service. For example, the production environment 101 may include one or more virtual machines 110 that provide computing resources (e.g. webservers, databases, etc.) for customers (e.g. website visitors) for the customer of the data storage service. In some embodiments, these virtual machines may act as clients from which backups are performed.

The disaster recovery environment 102 may include an isolated and/or secure environment that is separate from the production environment 101. In some embodiments, the production environment may store one or more backups (e.g. primary or secondary backups) of the virtual machines 110. For example, the disaster recover environment 102 may be part of one or more physical servers that are provided as part of a cloud-computing service that is provided by a different entity than the entity that provides the production environment. For example, the production environment 101 may be provided as part of Dell/EMC Data Domain™ data protection platform and the disaster recovery environment 102 may be provided by a different entity (e.g. Amazon Web Services (AWS) platform, Microsoft Azure platform, etc.). Accordingly, in some embodiments, the disaster recovery environment 102 may be provided as part of a user-account managed by the different entity (e.g. Amazon, Microsoft, etc.) and associated with the customer of the virtual machines 110. Accordingly, the system described herein may provide the customer with the ability to efficiently and seamlessly interact with the different entity that provides the on-demand infrastructure (e.g. Infrastructure as a Service (IaaS)) for the disaster recovery environment 102. The infrastructure may include one or more on-demand computing resources 180 for one or more recovery virtual machines 181.

The on-demand computing resources 180 may also include one or more recovery data storages 182. The recovery data storage 182 may store data used to recover a virtual machine (e.g. recovery or backup data of a virtual machine).

For example, the recovery data storage 182 may store rehydrated recovery data chunks from the recovery data stored by the storage system 150, or a storage component within the disaster recovery environment 102. Accordingly, a recovery data storage 182 may be associated with a particular recovery virtual machine 181 (or instance of a recovery virtual machine). For example, a recovery data storage 182 may be mounted (or attached) to a recovery virtual machine 181 as part of a recovery process for a virtual machine 110.

In one embodiment, storage system 150 may represent one or more components of a Data Domain™ Restorer (DDR)-based deduplication storage system, and backup server 172 may be implemented in conjunction with a Data Domain deduplication storage server provided by Dell/EMC™ Corporation for use with DDR storage devices. For example, the backup server 172 may be a stand-alone entity, or can be an element of the environment 100. In some embodiments, the backup server 172 may be an EMC Corp. Avamar server or an EMC Corp. Networker server, although no particular server is required and other backup and storage system configuration are contemplated. Storage system 150 may utilize certain protocol-specific namespaces that are the external interface to applications and include NFS (network file system) and CIFS (common internet file system) namespaces, as well as DD Boost provided by Dell/EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol (e.g. file-oriented access protocol) to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system. For example, the DD Boost protocol or API may be an example of a file-oriented access interface (or protocol). For instance, the DD Boost protocol may create metadata information related to backup functions (e.g. metadata related to backup type, identifiers, etc.).

As shown, the system may include a virtual machine(s) 110. In general, the virtual machine 110 is a virtualization of underlying hardware and/or software and, as such, may include or otherwise be associated with various underlying components. Virtual Machine 110 may host one or more applications 112, and may include local storage 114, as well as an interface for communicating with other systems and devices, such as the storage system 150. Accordingly, the virtual machine 110 may act as a client. In general, the applications 112 may create new and/or modified data that is desired to be protected. As such, the virtual machine 110 is an example of a host device. The local storage 114 can be used to locally store data, which may, along with the virtual machine itself be backed up using the storage system 150. The backup data can be restored to the local storage 114. The client 110 may include a backup client application that cooperates with storage system 150, to create backups of client data, which may include data 161. As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc.

The storage system 150, may include a storage appliance 152. Accordingly, backup data may be communicated from the virtual machine 110 to the storage appliance 152 for initial processing, after which the processed backup data is uploaded from the storage appliance 152 for storage at the data protection environment 156. For example, a backup application may cooperate with a backup client application of the virtual machine 110 to back up client data to the data protection environment 156. A backup application may also cooperate with a backup client application to restore backed up data from the data protection environment 156 to the virtual machine 110. In some embodiments, the storage appliance may include a Dell-EMC CloudBoost appliance, although any suitable appliance is contemplated. In addition, the storage appliance 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the storage appliance 152 can be performed using deduplication logic via deduplication module 155. For example, the deduplication module 155 can provide data segmentation, as well as in-flight encryption as the data is sent by the storage appliance 152 to the data protection environment 156.

The data protection environment 156 may store metadata 162 for the data 161 and include one or more instances of a filesystem 131 that catalogues files and other data residing in the data protection environment 156. In general, the storage of data 161 may be configured to store client data backups (e.g. recovery data) that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

Figure 2:
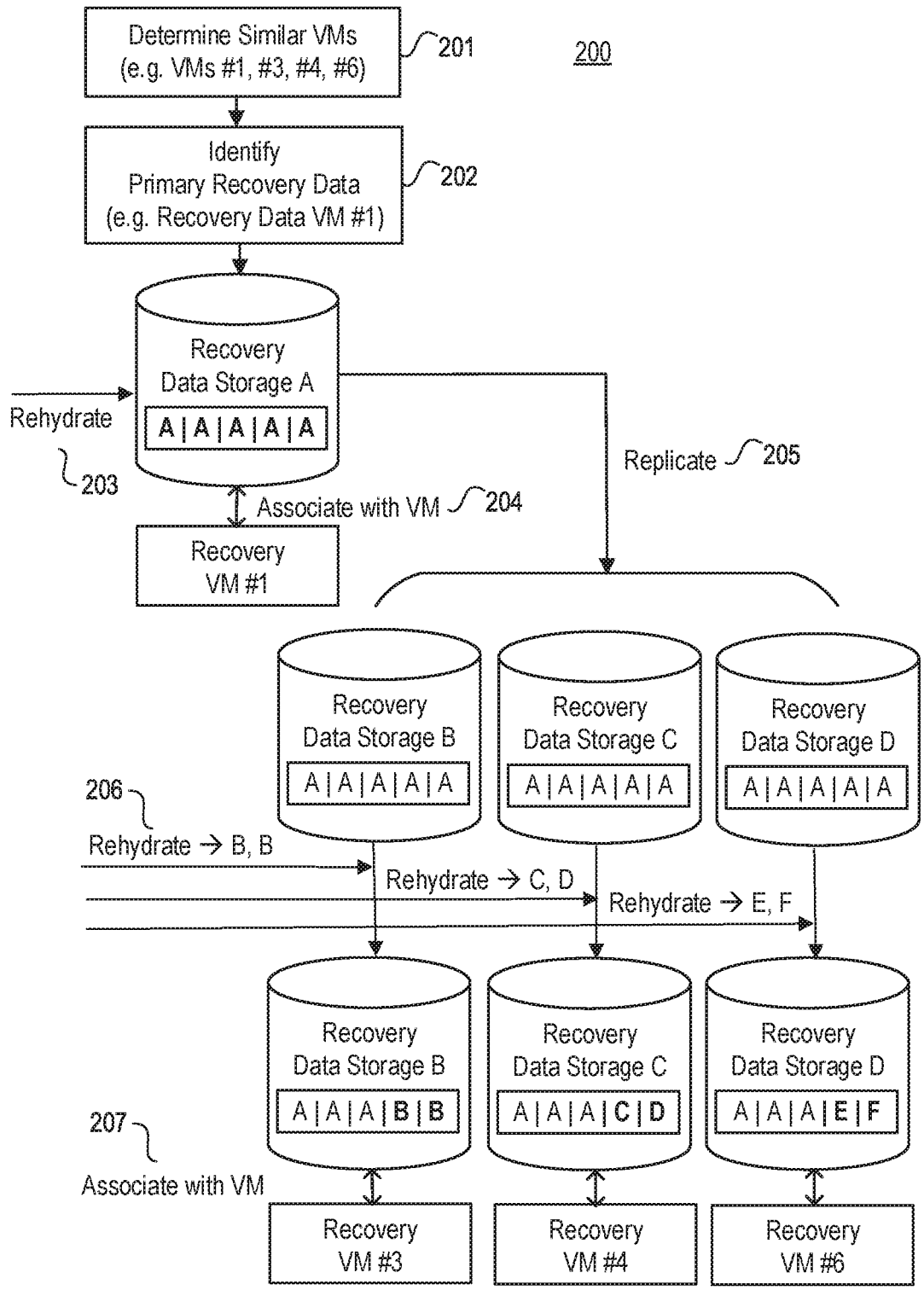
FIG. 2 is a diagram illustrating an example process flow for replicating a data storage as part of a process to recover multiple virtual machines according to one or more embodiments of the disclosure.

FIG. 2 is a diagram 200 illustrating an example process flow for replicating a data storage as part of a process to recover multiple virtual machines according to one or more embodiments of the disclosure. When initiating a process to recover multiple virtual machines, the system may determine whether any of the virtual machines are similar in 201. For example, in this scenario, the system may determine Virtual Machines (VMs) #1, #3, #4, and #6 are sufficiently similar. When determining whether virtual machines are similar, the system may determine a number of shared recovery data chunks required to restore a virtual machine. In some embodiments, the system may determine whether the number of shared recovery data chunks satisfy a similarity threshold. For example, a similarity threshold may require that at least 60% of the recovery data chunks for VMs #3, #4, and #6 are shared with virtual machine #1. In addition, in some embodiments, the system may determine whether virtual machines are sufficiently similar based on the software components installed on a set of virtual machines. For example, a set of virtual machines may share a suite of software components such as a common operating system or other files (e.g. system files). Accordingly, the system may determine that a set of virtual machines are sufficiently similar if share a predetermined amount (e.g. number or size) of software components. For example, if virtual machines share an operating system the system may determine the virtual machines are sufficiently similar. In addition, the system may determine whether the amount of shared software components (e.g. total MBs, GBs, etc.) satisfy a threshold.

Once the system determines that at least two or more of the virtual machines are similar, the system may determine which of the similar virtual machines is associated with a primary set of recovery data in 202. When determining which set of recovery data to identify as the primary set of recover data, the system may perform various specialized calculations and/or heuristics. For example, if the set of virtual machines to be recovered are backup instances of the same virtual machines at different times (e.g. scheduled backup times), the system may select a backup instance that was created at a time in between the other backup instances. For example, if VMs #1, #3, #4, and #6 are backup instances of a particular virtual machine at time points 9 am, 11 am, 1 pm, and 3 pm respectively, the system may identify one of VMs #3 or #4 as being associated with the primary set of recovery data as they correspond to a time between 9 am and 3 pm. Accordingly, such a heuristic may be based on the backup instance created between other backup instances being the most likely to share the most amount of data with the other backup instances. As another example, when determining which set of recovery data to identify as the primary recovery data set, the system may determine that a particular set of recovery data includes data that is used as a data template. For example, virtual machines may often share various software components such as an operating system or other files (e.g. system files). Accordingly, the system may identify a primary set of recovery data based on a determination that the recovery data includes software components that are shared across the similar virtual machines.

Returning to this example, the system may determine that the recovery data associated with VM #1 is to be used as the primary set of recovery data. The system may then initiate a process to recover the data associated with VM #1. In some embodiments, the process to recover data associated with VM #1 may include creating a recovery virtual machine (e.g. Recovery VM #1). Accordingly, in some embodiments, the system may assign a recovery data storage (e.g. Recovery Data Storage A) to a recovery virtual recovery machine (e.g. Recovery VM #1). In some embodiments, the size of the recovery data storage may be based on (e.g. mirror) the size of the data required to recover the virtual machine. In some embodiments, a recovery data storage may include any suitable type of data structure that may be provided by an on-demand (e.g. cloud) services provider such as a physical storage (e.g. Hard Disk Drive (HDD, Solid State Drive (SSD), etc.) and/or a virtual storage system. The system may then obtain the recovery data stored for VM #1. As described above, the recovery data may be stored as part of a storage system (e.g. storage system 150) in a deduplicated manner. For example, the recovery data may be stored as data chunks that are indexed using a hash value. Accordingly, in 203, the system may rehydrate the recovery data for VM #1. As referred to herein, rehydrating data may include performing processes to reverse various procedures implemented to store recovery data as described above (e.g. as part of storage system 150). For example, when initially storing data as part of a backup, the recovery data may be compressed, deduplicated, and/or encrypted. Accordingly, the rehydrating data may include reversing such a process to restore recovery data to a usable state. After, or as part of the rehydration process, the system may write the rehydrated recovery data (e.g. data chunks AAAAA) to Recovery Data Storage A.

The restored (or recovered, written, populated, etc.) recovery data storage (e.g. Recovery Data Storage A) may then be associated with the corresponding recovery virtual machine (e.g. Recovery VM #1) in 204. In some embodiments, associating a recovery data storage with a virtual machine may including mounting (or loading, installing, connecting, etc.) the recovery data storage with the appropriate virtual machine. In some embodiments, associating a recovery data storage with a virtual machine may include loading (or writing, installing, etc.) various system files (e.g. operating system and/or files, drivers, etc.) onto the recovery data storage. For example, certain system files may allow the recovery data storage to boot (or execute, load, etc.) on an on-demand services platform and be mounted (or included) as part of a virtual machine. In some embodiments, once a recovery data storage is restored, the associated recovery virtual machine may be shut down, and the recovery data storage may be mounted to the recovery virtual machine as a boot disk when creating the recovery virtual machine. In some embodiments, to further improve efficiency, the operating system and/or system files may be shared amongst the recovery data storages. The operating system and/or system files may or may not be part of the rehydrated data chunks as referred to above. It should be noted that the Recovery Data Storage A may be associated with the Recovery VM #1 before or after performing a replication of Recovery Data Storage A.

As described, to improve the efficiency of the virtual machine recovery process, the system may leverage the similarities (e.g. shared recover data chunks) amongst the similar virtual machines. Accordingly, the system may duplicate the recovery data associated with VM #1 by duplicating the data storage associated with the corresponding recovery virtual machine (e.g. Recovery VM #1). Accordingly, the system may replicate (or copy, mirror, duplicate, snapshot, etc.) Recovery Data Storage A in 205. As shown in this example, there are three virtual machines (e.g. VMs #3, #4, and #6), and accordingly, three additional recovery data storages may be created (e.g. Recovery Data Storage B, C, and D) by duplicating Recovery Data Storage A. As shown, Recovery Data Storages B, C, and D now each have the primary set of recovery data chunks (e.g. data chunks AAAAA). In some embodiments, the replication (e.g. replication 205) may be considered a first (or partial, initial, preliminary, etc.) step in the process to restore the data of the similar virtual machines. Accordingly, the second (or complete, subsequent, etc.) step to restore the data of the remaining similar virtual machines may include updating the recovery data chunks with the differing (or remaining) data chunks for each individual virtual machine. In some embodiments, this may include rehydrating only the differing data chunks required to recover the remaining virtual machines in 206. As shown in this example, the system may only be required to rehydrate data chunks BB, CD, and EF and write these data chunks to Recovery Data Storages B, C, and D respectively.

In a similar manner as described above in 203, the system may then associate Recovery VM #3, #4, and #6 with Recovery Data Storages B, C, and D respectively in 207. This may include mounting (or loading, installing, connecting, etc.) the recovery data storage with the appropriate virtual machine. In some embodiments this may include rebooting the recovery virtual machine and installing any required system files. As described, in some embodiments, to further improve efficiency, the systems files may be shared amongst the recovery data storages and may or may not be part of the rehydrated data chunks as referred to above.

Accordingly, the system may recover the set of virtual machines by creating a corresponding recovery virtual machine within a secure environment (e.g. disaster recovery environment 102) before being deployed to a production environment (e.g. production environment 101). For example, various tests may be performed on the recovery virtual machines (including various instances of a virtual machines) before being deployed to production virtual machines (e.g. virtual machines 110).

Figure 3:
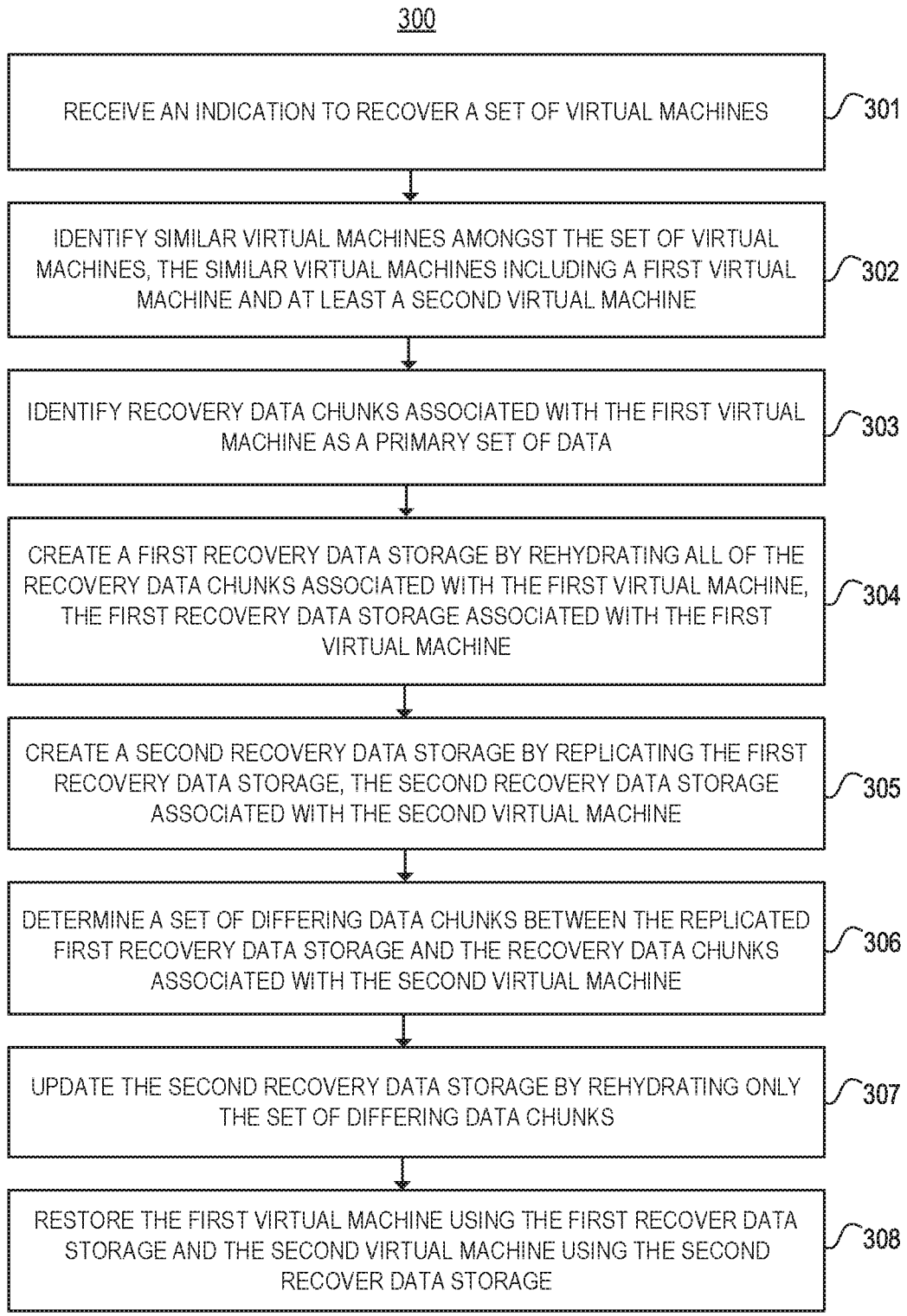
FIG. 3 is a flow diagram illustrating an example method of recovering multiple virtual machines according to one or more embodiments of the disclosure

FIG. 3 is a flow diagram illustrating an example method of restoring multiple virtual machines according to one or more embodiments of the disclosure. Process 300 may use processing logic, which may include software, hardware, or a combination thereof. For example, process 300 may be performed by a system including one or more components described in operating environment 100 (e.g. storage system 150, on-demand computing resources 180, etc.).

In 301, the system may receive an indication to recover a set of virtual machines. For example, a recovery (or restore) process may be initiated in response to a failure related to a production virtual machine (e.g. virtual machine 110). The virtual machines to be recovered may include multiple instances of a single virtual machine. In one embodiment, the set of virtual machines may include one or more backup instances (or versions) of the virtual machine at different time points. For example, a virtual machine may be backed up multiple times a day (or other schedule) and the recovery process may be initiated for multiple virtual machine backup instances. For instance, in response to a failure, the system may perform testing on multiple recovery instances of a virtual machine from different time points before applying a recovery virtual machine to a production environment (e.g. production environment 101).

In 302, the system may identify similar virtual machines amongst the set of virtual machines. In some embodiments, the system may identify similar virtual machines using a similarity threshold. For example, identifying similar virtual machines may include determining recovery data chunks associated with at least the first virtual machine and the second virtual machine satisfy a similarity threshold. In some embodiments, identifying similar virtual machines amongst the set of virtual machines may include determining the similar virtual machines share a predetermined amount of software components. For example, the system may determine the similar virtual machines share an operating system or include a certain amount of shared software components.

The system may identify a primary set of data from which data may be copied to improve efficiency. Accordingly, 303, the system may identify recovery data chunks associated with the first virtual machine as a primary set of data. In some embodiments, the similar virtual machines may further include a third virtual machine, and accordingly, the first, second, and third virtual machines may each comprise a backup instance of a particular virtual machine at a time point. Accordingly, identifying the recovery data chunks associated with the first virtual machine as the primary set of data may include determining the time point of the backup instance of the first virtual machine is between the time points of the backup instances of the second and third virtual machines. For example, when determining which set of recovery data to identify as the primary data set, the system may perform various specialized calculations and/or heuristics. For example, if the set of virtual machines to be recovered are backup instances of the same virtual machines at different times (e.g. scheduled backup times), the system may select a backup instance that was created at a time in between the other backup instances. Accordingly, such a heuristic may be based on the backup instance created between other backup instances being the most likely to share the most amount of data with the other backup instances. As another example, the system may identify a primary set of recovery data based on virtual machines using various software templates (e.g. operating system template) that would be shared amongst virtual machines. In addition, the system may perform various calculations (e.g. data chunk hash value comparison) to determine a primary set of data. After identifying a primary set of recovery data, the system may create a recovery data storage for each of the virtual machines deemed to be similar.

Accordingly, in 304, the system may create a first recovery data storage associated with a first recovery virtual machine. The first recovery data storage may be created by rehydrating all of the recovery data chunks associated with the first virtual machine. In some embodiments, all of the recovery data (or substantially all of the recovery data) may include the data chunks required to recover the virtual machine in contrast to obtaining only the differing (or different) data chunks as further described herein after replicating the first recovery data storage. In some embodiments, replicating the primary set of recovery data may be part of an initial recovery process for the remaining virtual machines. The recovery process may then be completed by obtaining the remaining or differing recovery data chunks.

Thus, as described, the system may leverage the restored data to efficiently restore similar virtual machines. For example, previous restoration processes often restored each virtual machine independently irrespective of being included as part of a process to restore virtual machines that may share data.

Accordingly, in 305, the system may create a second recovery data storage by replicating the first recovery data storage. The second recovery data storage may be associated with a second recovery virtual machine. In some embodiments, the recovery data storages may include a virtual storage (e.g. a virtual disk) as part of an on-demand storage service. In some embodiments, creating a recovery data storage may include reserving (or initializing) a data storage, rehydrating the recovery data (e.g. obtaining compressed data from data storage system 150), writing the rehydrated data to the data storage, or a combination thereof.

In some embodiments, replicating the primary set of recovery data to a data storage associated with similar virtual machines, may be part of an initial recovery process for the remaining virtual machines. The recovery process may be completed by obtaining the remaining or differing recovery data chunks.

Accordingly, in 306, the system may determine a set of differing data chunks between the replicated first recovery data storage and the recovery data chunks associated with the second virtual machine. For example, the system may perform a hash value comparison between the current recovery data chunks stored in the recovery data storage and the recovery data chunks required to complete the recovery of the second virtual machines.

In 307, the system may update the second recovery data storage by rehydrating only the set of differing data chunks. For example, the system may determine a set of differing data chunks between the copy of the restored first recovery data storage and the recovery data chunks associated with the second virtual machine.

In 308, the system may restore the first virtual machine using the first recovery data storage and the second virtual machine using the second recovery data storage. For example, the first recovery data storage may be mounted to the first recovery virtual machine and the second recovery data storage may be mounted to the second recovery virtual machine. Accordingly, the system may recover the first virtual machine using the first recovery virtual machine and the second virtual machine using the second recovery virtual machine.

As described, in some embodiments, the system may mount the first recovery data storage to the first virtual machine, and the second recovery data storage to the second recovery virtual machine to create the first recovery virtual machine and the second recovery virtual machine within a secure disaster recovery environment. Accordingly, the system may then perform one or more tests on the first recovery virtual machine and the second recovery virtual machine within the secure disaster recovery environment before deploying the recovery virtual machines within the production environment. In some embodiments, deploying the recovery virtual machines within the production environment may include transferring all or some of the restored recovery data to the production virtual machines.

Accordingly, in some embodiments, described is a system (and method) that efficiently recovers multiple virtual machines by leveraging similarities between recovery data chunks.

Figure 4:
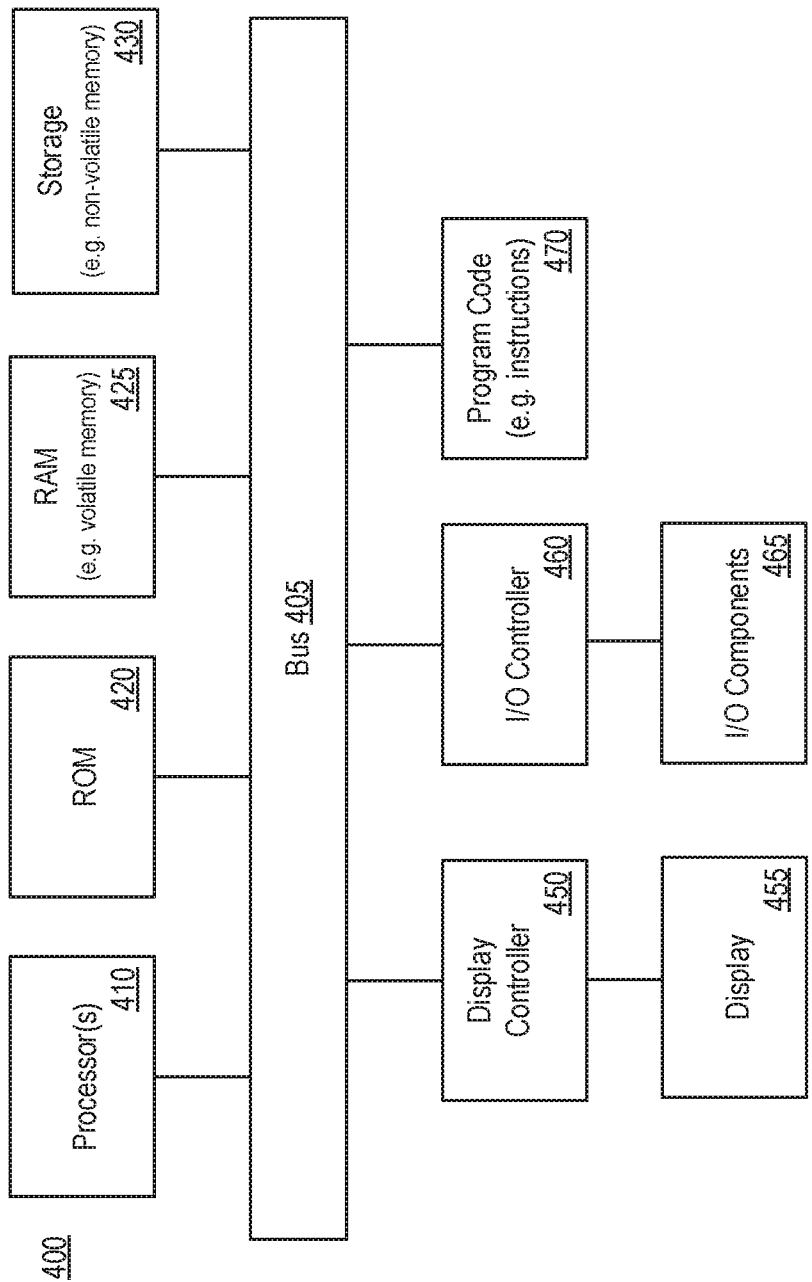
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. storage system 150, on-demand computing resources 180, or virtual machine 110, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein. Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive an indication to recover a set of virtual machines;

identify similar virtual machines amongst the set of virtual machines, the similar virtual machines including a first virtual machine and at least a second virtual machine;

identify recovery data chunks associated with the first virtual machine as a primary set of data;

create a first recovery data storage by rehydrating all of the recovery data chunks associated with the first virtual machine, the first recovery data storage associated with a first recovery virtual machine;

create a second recovery data storage by replicating the first recovery data storage, the second recovery data storage associated with a second recovery virtual machine;

determine a set of differing data chunks between the replicated first recovery data storage and the recovery data chunks associated with the second virtual machine;

update the second recovery data storage by rehydrating only the set of differing data chunks; and recover the first virtual machine using the first recovery virtual machine and the second virtual machine using the second recovery virtual machine.

2. The system of claim 1, wherein the similar virtual machines further include a third virtual machine, and wherein the first, second, and third virtual machines each comprise a backup instance of a particular virtual machine at a time point.

3. The system of claim 2, wherein identifying the recovery data chunks associated with the first virtual machine as the primary set of data includes:

determining the time point of the backup instance comprising the first virtual machine is between the time points of the backup instances comprises the second and third virtual machines.

4. The system of claim 1, wherein identifying similar virtual machines amongst the set of virtual machines includes determining the recovery data chunks associated with the similar virtual machines satisfy a similarity threshold.

5. The system of claim 4, wherein determining the recovery data chunks associated with the similar virtual machines satisfy the similarity threshold includes:

comparing a number of shared recover data chunks between the similar virtual machines to a total number of recovery data chunks required to restore one or more of the similar virtual machines.

6. The system of claim 1, wherein identifying similar virtual machines amongst the set of virtual machines includes determining the similar virtual machines share a predetermined amount of software components.

7. The system of claim 1, wherein recovering the first virtual machine using the first recovery virtual machine and the second virtual machine using the second recovery virtual machine includes:

mounting the first recovery data storage to the first virtual machine, and the second recovery data storage to the second recovery virtual machine;

creating the first recovery virtual machine and the second recovery virtual machine within a secure disaster recovery environment; and performing one or more tests on the first recovery virtual machine and the second recovery virtual machine within the secure disaster recovery environment.

8. A method comprising:

receiving an indication to recover a set of virtual machines;

identifying similar virtual machines amongst the set of virtual machines, the similar virtual machines including a first virtual machine and at least a second virtual machine;

identifying recovery data chunks associated with the first virtual machine as a primary set of data;

creating a first recovery data storage by rehydrating all of the recovery data chunks associated with the first virtual machine, the first recovery data storage associated with a first recovery virtual machine;

creating a second recovery data storage by replicating the first recovery data storage, the second recovery data storage associated with a second recovery virtual machine;

determining a set of differing data chunks between the replicated first recovery data storage and the recovery data chunks associated with the second virtual machine;

updating the second recovery data storage by rehydrating only the set of differing data chunks; and recovering the first virtual machine using the first recovery virtual machine and the second virtual machine using the second recovery virtual machine.

9. The method of claim 8, wherein the similar virtual machines further include a third virtual machine, and wherein the first, second, and third virtual machines each comprise a backup instance of a particular virtual machine at a time point.

10. The method of claim 9, wherein identifying the recovery data chunks associated with the first virtual machine as the primary set of data includes:

determining the time point of the backup instance comprising the first virtual machine is between the time points of the backup instances comprises the second and third virtual machines.

11. The method of claim 8, wherein identifying similar virtual machines amongst the set of virtual machines includes determining the recovery data chunks associated with the similar virtual machines satisfy a similarity threshold.

12. The method of claim 8, wherein determining the recovery data chunks associated with the similar virtual machines satisfy the similarity threshold includes:

comparing a number of shared recover data chunks between the similar virtual machines to a total number of recovery data chunks required to restore one or more of the similar virtual machines.

13. The method of claim 8, wherein identifying similar virtual machines amongst the set of virtual machines includes determining the similar virtual machines share a predetermined amount of software components.

14. The method of claim 8, wherein recovering the first virtual machine using the first recovery virtual machine and the second virtual machine using the second recovery virtual machine includes:

mounting the first recovery data storage to the first virtual machine, and the second recovery data storage to the second recovery virtual machine;

creating the first recovery virtual machine and the second recovery virtual machine within a secure disaster recovery environment; and performing one or more tests on the first recovery virtual machine and the second recovery virtual machine within the secure disaster recovery environment.

15. A computer program product comprising a non-transitory computer-readable medium having a computer-readable program code embodied therein to be executed by one or more processors, the program code including instructions to:

receive an indication to recover a set of virtual machines;

identify similar virtual machines amongst the set of virtual machines, the similar virtual machines including a first virtual machine and at least a second virtual machine;

identify recovery data chunks associated with the first virtual machine as a primary set of data;

create a first recovery data storage by rehydrating all of the recovery data chunks associated with the first virtual machine, the first recovery data storage associated with a first recovery virtual machine;

create a second recovery data storage by replicating the first recovery data storage, the second recovery data storage associated with a second recovery virtual machine;

determine a set of differing data chunks between the replicated first recovery data storage and the recovery data chunks associated with the second virtual machine;

update the second recovery data storage by rehydrating only the set of differing data chunks; and recover the first virtual machine using the first recovery virtual machine and the second virtual machine using the second recovery virtual machine.

16. The computer program product of claim 15, wherein the similar virtual machines further include a third virtual machine, and wherein the first, second, and third virtual machines each comprise a backup instance of a particular virtual machine at a time point.

17. The computer program product of claim 16, wherein identifying the recovery data chunks associated with the first virtual machine as the primary set of data includes:

determining the time point of the backup instance comprising the first virtual machine is between the time points of the backup instances comprises the second and third virtual machines.

18. The computer program product of claim 15, wherein identifying similar virtual machines amongst the set of virtual machines includes determining the recovery data chunks associated with the similar virtual machines satisfy a similarity threshold.

19. The computer program product of claim 18, wherein determining the recovery data chunks associated with the similar virtual machines satisfy the similarity threshold includes:

comparing a number of shared recover data chunks between the similar virtual machines to a total number of recovery data chunks required to restore one or more of the similar virtual machines.

20. The computer program product of claim 15, wherein identifying similar virtual machines amongst the set of virtual machines includes determining the similar virtual machines share a predetermined amount of software components.

* * * * *